United States Patent [19]

Alberger

[11] 4,224,995
[45] Sep. 30, 1980

[54] DEVICE FOR REMOVING PALMETTO BUSHES

[76] Inventor: Richard C. Alberger, 151 E. 57th St., Hialeah, Fla. 33013

[21] Appl. No.: 935,545

[22] Filed: Aug. 21, 1978

[51] Int. Cl.³ .................... A01D 31/00; A01B 39/12
[52] U.S. Cl. ................................. 171/105; 37/2 R; 172/447; 172/697
[58] Field of Search .................. 172/27, 29, 197, 198, 172/378, 391, 439, 446, 447, 451, 687, 688, 697, 699; 37/2 R, 2 P; 56/384, 386, 400, 400.01; 171/63, 65, 105; 280/446 A, 456 A, 460 A, 461 A

[56] References Cited

U.S. PATENT DOCUMENTS

| 757,795 | 4/1904 | Walker | 56/400.01 |
| 2,479,719 | 8/1949 | Boylan | 171/65 |
| 2,512,114 | 6/1950 | Robinson et al. | 172/447 |
| 2,711,036 | 6/1955 | Crenshaw | 172/446 X |
| 2,731,896 | 1/1956 | Wurster | 172/451 X |
| 2,735,198 | 2/1956 | Zogg et al. | 37/2 R |

FOREIGN PATENT DOCUMENTS

| 906384 | 3/1954 | Fed. Rep. of Germany | 171/105 |
| 87645 | 5/1956 | Norway | 280/456 A |
| 95314 | 11/1959 | Norway | 280/456 A |
| 808218 | 1/1959 | United Kingdom | 280/461 A |

*Primary Examiner*—Richard T. Stouffer

[57] ABSTRACT

A device for removing palmetto bushes which is adapted to be attached to a 3 point hitch and which is composed of a reinforced laterally extending or horizontally disposed frame having an attachment surface and a plurality of downwardly and forwardly extending equispaced fingers of tempered spring steel extending vertically downwardly and being forwardly tilted at an angle of between 5 and 20 degrees for use in digging, scraping, and raking palmetto bushes upon forward movement of a tractor to which the device is attached.

10 Claims, 3 Drawing Figures

DEVICE FOR REMOVING PALMETTO BUSHES

FIELD OF THE INVENTION

This invention relates to an implement for attachment to a tractor and, more particularly, to an implement which is useful in removing palmetto bushes from the earth.

BACKGROUND OF THE INVENTION

In the past, there have been many types of attachments for tractors for various types of operations. Representative prior art patents are U.S. Pat. No. 711,933 for an Agricultural Rake; U.S. Pat. No. 1,317,764 for a Cultivator; U.S. Pat. No. 1,503,796 for a Side Delivery Rake And Swath Turner; U.S. Pat. No. 2,581,661 for a Method of Cutting and Harvesting Vine and Bush Crops; and U.S. Pat. No. 3,246,458 for a Vine Shredder. It is apparent from this prior art that there have been numerous problems faced in the past of raking and removing materials which grow in the earth.

One of the most stubborn materials to be removed as is well known in the South Florida area, is that known as the palmetto bush. The palmetto bush has an extensive root system and, in the past, there has been a substantial problem in removing them. The problem of clearing land of palmetto bushes has been attacked by using a bulldozer to push them from the earth. This results in the extensive root system picking up large amounts of dirt as the bush is pushed from the earth leaving a gaping hole and causing the ball of the bush once removed to be composed of about one-half dirt and one-half root system materials. When a field has been cleared using a bulldozer, there are many holes throughout it which requires further leveling and work in order to put it in form for use in building or in growing a crop. Additionally, the materials which are bulldozed to the side of a field cannot be burned because they are more than one-half and usually about 80% dirt. For this reason, they are left as hedge groves or borders for the fields but this results in the palmetto bushes sprouting again leaving a very unsightly and undesirable mess.

Using the instant invention to be described hereinafter, the bushes can be removed without leaving gaping holes in the earth and without removing much of the dirt to the end that the same may be collected and readily burned.

OBJECTS OF THE INVENTION

It is, accordingly, an object of this invention to provide an improved tool which is simple and inexpensive in construction and which is adapted to be connected to a 3 point hitch of a medium size tractor for use by small tractor owners in removing palmetto bushes from fields and which is composed of a heavily reinforced lateral member with downwardly and forwardly tilted equispaced tempered spring steel fingers of equal length which, when attached to a 3 point hitch, are adapted to be positioned behind a palmetto bush with the fingers embedded in the root system closely adjacent the plant so that, as forward movement of the tractor takes place, the fingers will bite deeper into the root system and forwardly dislodging it from the earth as the tractor moves forward pulling it or raking it from the earth without removal simultaneously of the earth.

In accordance with these and other objects which will become apparent hereinafter, the instant invention will now be described with reference to the accompanying drawings, in which:

Figure 1:
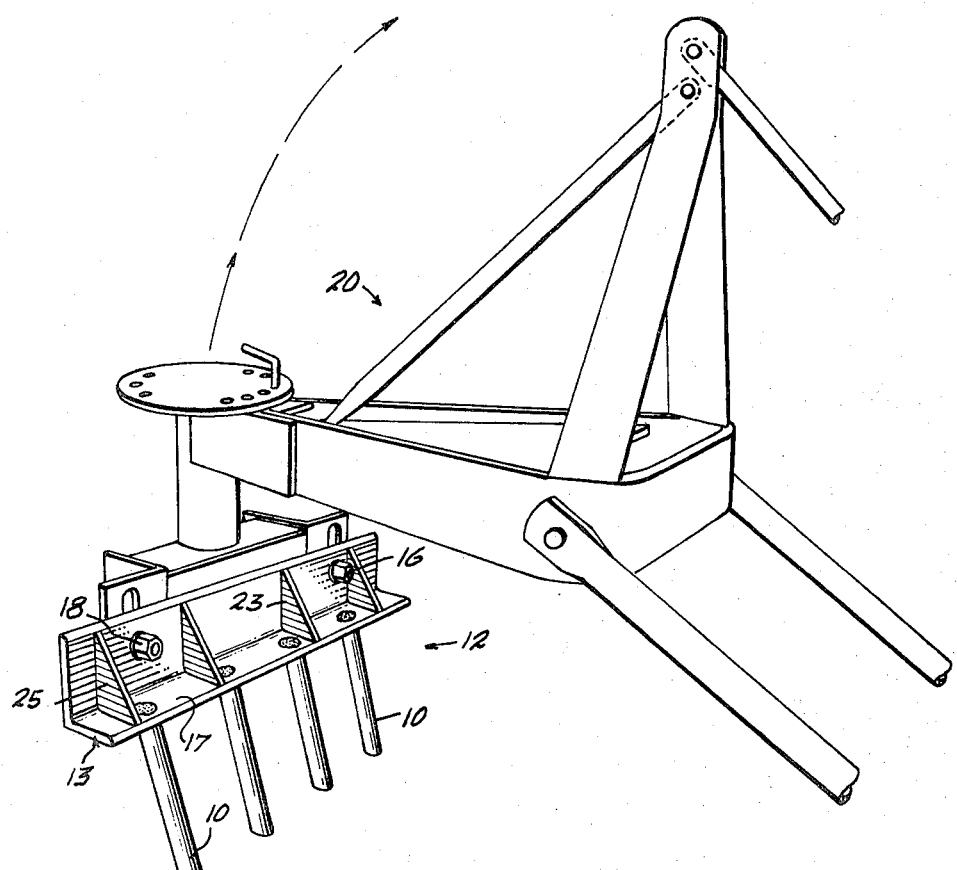
FIG. 1 is a perspective view of the instant invention.
Figure 2:
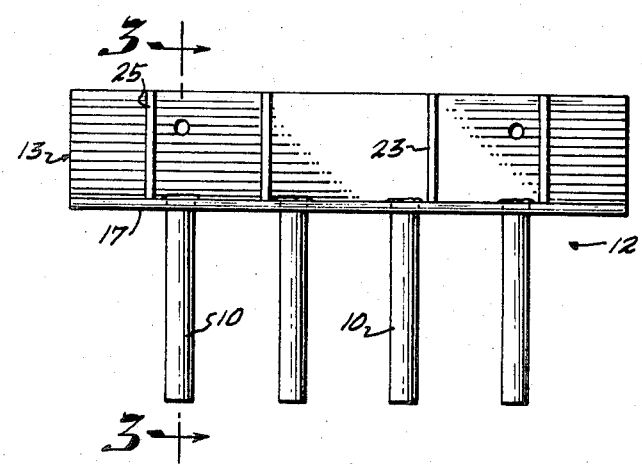
FIG. 2 is an elevation view looking to the left in FIG. 1 illustrating the attachment.
Figure 3:
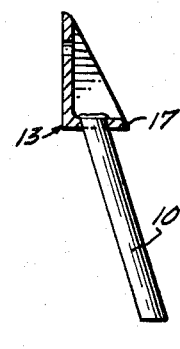
FIG. 3 is a view in crosssection taken on the plane indicated by the line 3—3 of FIG. 2 and looking in the direction of the arrows.

DESCRIPTION OF THE PREFERRED EMBODIMENT:

This invention is of a device for attachment to tractors for use in pulling palmetto bushes from the earth. Generally, the device designated by the numeral 12 consists of a plurality of slightly forwardly angled pins, such as that designated by the numeral 10 welded to an angle iron 13 which may be a suitable form, such as a street car rail, The device is bolted as at 16 and 18 to a conventional 3 point hitch 20 of a tractor not shown. The hitch is conventionally hydraulically operated to up and down positions indicated by the arrowed line. In use, a tractor is backed up to a clump of palmettoes. The device is dropped in back of the clump and the tractor is run forwardly. This results in the clump being pulled from the earth with little dirt being removed in the process. This tool is used differently from other efforts in the past to remove palmettoes. Presently the same are ordinarily bulldozed out by pushing them which removes much top soil and creates a disposal problem as a pile of half dirt and half roots will not burn. On the other hand, a pile of palmettoes extracted by the present invention may be burned quite readily.

Referring more in detail to the drawings, and to the invention there illustrated, in the preferred embodiment the angle iron is about one-half inches thick and is preferably about 6 inches on the Vertical flange and about 3 inches on the other flange. Preferably, the angle is reinforced by a gusset plate such as 23 and 25 which may be suitably formed of triangular shaped ⅜ inch flat iron. In a preferred embodiment, the total lateral span across the tool is about 36 inches to 24 inches with 30 inches being the best preferred embodiment. Further, 5 prongs may be used, however, preferably 4 prongs or teeth 10 are used which accommodates the device for attachment to a medium size tractor. The fingers are preferably about 10 inches in length and about 5 inches apart and are of a diameter of about 1-¼ inch to 1-½ inches. It will be seen that the fingers are tilted forwardly at an angle of between 5 and 20 degrees with respect to the bottom flange 17 of the angle iron, preferably being at about the angle shown in the drawings.

In use, the device is backed over the bush and when the tractor pulls forwardly, the fingers uproot the device with the forward tilting fingers digging into the root system as the tractor moves forwardly pulling, raking and scraping the root system free and clear of the earth without removing large amounts of soil.

The angle iron is made of steel and the fingers are constructed of tempered spring steel in the instant device.

What is claimed is:
1. A digging device adapted for attachment to a 3 point hitch of a tractor for use in removing palmetto bushes from the earth comprising;

an angle iron support frame having a horizontal member with an upper horizontal surface and a vertical member with a forwardly faciang vertical surface, said vertical surface approximately at right angles to said horizontal surface and collectively defining a forward frame face, the frame face being reinforced by a plurality of generally right angle gusset members each connected at the vertical and horizontal surfaces on the foward face, a plurality of generally cylindrical, downwardly and forwardly extending teeth being of a uniform diameter and cross section having a first end fixedly connected to the horizontal member at predetermined widely spaced intervals and a second truncated terminal end, and means for adapting the frame for use with a 3 point tractor-type hitch.

2. The device as set forth in claim 1 wherein said frame is of a lateral length of between 24 inches and 36 inches.

3. The device as set forth in claim 2 wherein the lateral length is 30 inches.

4. The device as set forth in claim 1 wherein 4 fingers are provided.

5. The device as set forth in claim 4 wherein said teeth are about 10 inches in length and of a diameter between $1\tfrac{1}{4}$ inch and $1\tfrac{1}{2}$ inch.

6. The device as set forth in claim 5 wherein the teeth are spaced 5 inches apart and tilted forwardly with respect to the vertical surface between 5 and 20 degrees.

7. The device as set forth in claim 1 wherein the gusset members are reinforcing means composed of approximately $\tfrac{3}{8}$ inch thick flat iron gussets between the horizontal and vertical surface and the frame, the frame is made of a strong material of the strength of steel and approximately $\tfrac{1}{2}$ inch thick.

8. The device as set forth in claim 7 wherein said vertical surface is 6 inches in height and said horizontal surface is about 3 inches in size.

9. The device as set forth in claim 1 wherein said teeth are of tempered spring steel.

10. The device as set forth in claim 1 wherein there are four gusset members and four teeth, the teeth being attached to the horizontal member adjacent each gusset member respectively.

* * * * *